Patented Aug. 24, 1943

2,327,405

UNITED STATES PATENT OFFICE 2,327,405

PRINTING VAT DYESTUFFS

Alfred Davidson, Ernest Chapman, Simon Thomson McQueen, and Joseph Payman, Blackley, Manchester, England, assignors to Imperial Chemical Industries Limited, a corporation of Great Britain No Drawing. Application March 13, 1940, Serial No. 323,816. In Great Britain March 20, 1939

5 Claims. (Cl. 8—70)

This invention relates to improved vat dyestuff printing pastes.

The bulk of the printing of vat dyestuffs is effected by making up the dyestuff into a printing paste with a thickening agent, a reducing agent and an alkali and printing assistants such as glycerine, applying the printing paste to the fabric and developing it thereon by a steaming treatment. The steaming treatment is nowadays mostly done under conditions such that the print is subjected to the action of steam at about 100° C. for a period of about 2–8 minutes.

In conjunction with such steaming practice, there arises often the liability that the margin of safety allowed in the period of steaming may prove inadequate, perhaps by reason of insufficient supply of steam or other inadvertency, so that incomplete devolopment of shade occurs and the print is unsatisfactory. This condition arises more particularly in connection with those vat dyestuffs which are relatively slower in developing, amongst which there may be especially mentioned the indigoid and thioindigoid dyestuffs. It has therefore been the custom to include in the printing paste such printing assistants as, for example, anthraquinone and sodium anthraquinone-2-sulphonate which have been found to increase the rate of development of the more slowly developing vat dyestuffs. It has also been described in British Patent No. 361,350 to use iron compounds, for example, ferrous sulphate in making some leuco thioindigoid dyestuff preparations distinguished by their good capacity for being fixed.

We have now found that iron phthalocyanines and their derivatives are suitable for use as printing assistants in connexion with vat dyestuffs, more particularly indigoid and thioindigoid dyestuffs and halogenated anthanthrones.

Accordingly the present invention relates to the manufacture of vat dyestuff printing pastes by a process comprising incorporating in the ingredients therefor iron phthalocyanines or their derivatives, carrying as substituents water-solubilizing groups, for example, sulphonic acid or carboxylic acid groups. For instance, there may be employed as printing assistants ferrous phthalocyanine, sulphonated ferrous phthalocyanine and chloroferric phthalocyanine.

According to a further feature of the invention the iron phthalocyanines, as defined above, are incorporated with the vat dyestuffs prior to the making up of the printing pastes.

We have found that these new assistants are effective in unusually small proportions, such as for example one part of the assistant in 10,000 parts of printing paste, and that they are also excellent as regards their beneficial effect on the rate of development of the print. Moreover, whereas in the case of the printing assistants hitherto in use, it has been frequently necessary, in order to avoid undesirable results such as dullness of shade, carefully to select the assistant to suit the particular dyestuff employed, the present assistants do not cause dullness of shade and offer the convenience that they are capable of general application irrespective of the particular dyestuff concerned.

The following examples, in which parts are by weight, illustrate but do not limit the invention.

Example 1

The following printing paste is made:

| | Parts |
|---|---|
| 6:6'-Dichloro-4:4'-dimethylthioindigo as an aqueous paste containing 12.5% of the dyestuff | 100 |
| Water | 100 |
| British gum thickening (20 parts of gum to 80 parts of water) | 548 |
| Glycerol | 50 |
| Sodium formaldehyde sulphoxylate | 80 |
| Potassium carbonate | 120 |
| Ferrous phthalocyanine as a 5% aqueous paste (ferrous phthalocyanine may be made by heating o-cyanobenzamide and metalic iron at 250° C.) | 2 |
| | 1000 |

The cotton goods are printed with the paste, dried and aged for 3–5 minutes in a Mather & Platt ager, rinsed in water, oxidised in a solution containing 1–2% sodium bichromate and 1–2% acetic acid, rinsed and soaped.

The above printing paste fixes more quickly, resulting in a print of greater depth of colour than a printing paste made in the same manner but without ferrous phthalocyanine.

Example 2

The following printing paste is prepared:

| | Parts |
|---|---|
| Dibromoanthanthrone as an aqueous paste containing 10% dyestuff | 100 |
| Water | 100 |
| British gum thickening (20 parts of gum to 80 parts of water) | 548 |
| Glycerol | 50 |
| Sodium formaldehyde sulphoxylate | 80 |
| Potassium carbonate | 120 |
| Ferrous phthalocyanine as a 5% aqueous paste | 2 |
| | 1000 |

When printed by the process described in Example 1, the above paste fixes more quickly than a similar paste from which ferrous phthalocyanine is omitted.

Example 3

The following printing paste is prepared:

| | Parts |
|---|---|
| 6:6'-Dichloro-4:4'-dimethylthioindigo as an aqueous paste containing 12.5% of the dyestuff | 150 |
| Water | 20 |
| British gum thickening (35 parts of gum to 65 parts of water) | 500 |
| Glycerol | 50 |
| Sodium formaldehyde sulphoxylate | 80 |
| Potassium carbonate | 120 |
| Sulphonated ferrous phthalocyanine as an 0.1% aqueous solution | 80 |
| | 1000 |

The above paste is applied as in Example 1, and it fixes more quickly than a similar paste from which sulphonated ferrous phthalocyanine is omitted.

The sulphonated ferrous phthalocyanine is made by heating the ferrous phthalocyanine referred to above with 20% oleum at 50° C. for 2 hours, pouring the mixture into water, making alkaline with ammonia and filtering from any unchanged starting material.

Example 4

The following printing paste is prepared:

| | Parts |
|---|---|
| 6:6'-Diethoxythioindigo as an aqueous paste containing 10% of the dyestuff | 150 |
| British gum thickening (20 parts of gum to 80 parts of water) | 520 |
| Glycerol | 50 |
| Sodium formaldehyde sulphoxylate | 80 |
| Potassium carbonate | 120 |
| Sulphonated ferrous phthalocyanine (0.1% aqueous solution) | 80 |
| | 1000 |

The printing process is the same as that of Example 1, and the effect of the sulphonated ferrous phthalocyanine is as described in Example 3.

Example 5

The following printing paste is prepared:

| | Parts |
|---|---|
| 6:6'-Dichloro-4:4'-dimethylthioindigo as an aqueous paste containing 12.5% of the dyestuff | 100 |
| Water | 101.5 |
| British gum thickening (35 parts of gum to 65 parts of water) | 548 |
| Glycerol | 50 |
| Sodium formaldehyde sulphoxylate | 80 |
| Potassium carbonate | 120 |
| Chloroferric phthalocyanine as a 5% aqueous paste (chloroferric phthalocyanine may be made as described in Journ. Chem. Soc. 1936, p. 1735) | 0.5 |
| | 1000 |

The cotton goods are printed with the paste, dried and aged for 3–5 minutes in a Mather & Platt ager, rinsed in water, oxidised in a solution containing 1–2% sodium bichromate and 1–2% acetic acid, rinsed and soaped.

The above printing paste fixes more rapidly, resulting in a print of greater depth of colour than a printing paste made in the same manner but without chloroferric phthalocyanine.

Example 6

The following printing paste is prepared:

| | Parts |
|---|---|
| Dibromoanthanthrone as an aqueous paste containing approximately 10% dyestuff | 150 |
| Water | 51.8 |
| British gum thickening (35 parts of gum to 65 parts of water) | 548 |
| Glycerol | 50 |
| Sodium formaldehyde sulphoxylate | 80 |
| Potassium carbonate | 120 |
| Carboxylated iron phthalocyanine as a 2.5% aqueous paste (carboxylated iron phthalocyanine is made as described in Example 4 of British Patent No. 487,261) | 0.2 |
| | 1000 |

The paste is applied as in Example 1 and it fixes more quickly than a similar paste from which carboxylated iron phthalocyanine is omitted.

Example 7

1000 parts of a 12.5% aqueous paste of 6:6'-dichloro-4:4'-dimethylthioindigo are mixed with 8 parts of a 5% aqueous paste of ferrous phthalocyanine. The resulting vat dyestuff paste is eminently suitable for being converted by admixture with the usual ingredients (reducing agent, alkali, thickening agent and printing assistants such as glycerine) into a printing paste of excellent development properties.

It will be noted that in the examples above, the ratio of phthalocyanine assistant employed to weight of total printing paste varies from 5 parts per million in Example 6 to 100 parts per million in Example 1. It is clear that the exact quantity of iron-phthalocyanine compound employed for this invention may vary within very wide limits, provided it is altogether kept sufficiently low to avoid any visible alterations or dullness in the shade of the vat-dye print obtained. As compared to the quantity of vat dye, the proportion of assistant in the above examples varies from 0.3% to 1%. These are much smaller ratios than the 1/20 to 1/2 molal ratios customarily recommended in the case of inorganic iron salts, and will for the purpose of distinction hereinafter be referred to as catalytic quantities. Also, the expressions "assistant" and "printing assistant," when used in the claims below, shall be understood as referring to an agent which, at least as part of its activity, is capable of accelerating the rate of color development in the steaming step.

We claim:

1. A vat dyestuff printing paste containing as printing assistants from 5 to 100 parts per million of ferrous phthalocyanine.

2. A color composition comprising a vat dyestuff and an iron phthalocyanine compound, the latter being present in quantity not exceeding 1% as compared to the weight of the vat dyestuff.

3. A coloring composition comprising a vat dyestuff selected from the group consisting of indigoes, thioindigoes and halogenated anthanthrones, and a phthalocyanine dyestuff selected from the group consisting of ferrous phthalocyanine, chloroferric-phthalocyanine, their sulfonated derivatives and their carboxylated derivatives, the proportion of the two dyestuffs being from about 0.3% to 1% of the latter as compared to the weight of the former.

4. A process of printing textile fabric with vat dyestuffs, which comprises applying thereto a printing paste containing, beside the vat dyestuff and thickening, reducing and alkaline agents, a quantity of an iron phthalocyanine compound ranging from 5 to 100 parts per million as compared to the weight of the printing paste.

5. A process of printing textile fabric with vat dyestuffs, which comprises applying thereto a vat dyestuff printing paste containing as assistant a quantity of ferrous phthalocyanine not exceeding 1% by weight as compared to the weight of the vat dyestuff.

ALFRED DAVIDSON.
ERNEST CHAPMAN.
SIMON THOMSON McQUEEN.
JOSEPH PAYMAN.